(12) United States Patent
Rainer

(10) Patent No.: US 8,834,816 B1
(45) Date of Patent: Sep. 16, 2014

(54) PROCESS FOR RECOVERING METALS FROM CYANIDE TAILINGS

(76) Inventor: Norman B. Rainer, Richmond, VA (US)

( * ) Notice: Subject to any disclaimer, the term of this patent is extended or adjusted under 35 U.S.C. 154(b) by 210 days.

(21) Appl. No.: 13/374,726

(22) Filed: Jan. 11, 2012

Related U.S. Application Data

(60) Provisional application No. 61/461,734, filed on Jan. 24, 2011.

(51) Int. Cl.
*C02F 1/10* (2006.01)
*C02F 1/28* (2006.01)

(52) U.S. Cl.
CPC .... *C02F 1/10* (2013.01); *C02F 1/28* (2013.01)
USPC .......................................................... 423/25

(58) Field of Classification Search
None
See application file for complete search history.

(56) References Cited

U.S. PATENT DOCUMENTS

| 3,788,983 | A | * | 1/1974 | Fries | 210/667 |
| 5,187,200 | A | * | 2/1993 | Rainer | 524/30 |
| 8,263,229 | B1 | * | 9/2012 | Rainer | 428/435 |

* cited by examiner

*Primary Examiner* — Melissa Stalder
(74) *Attorney, Agent, or Firm* — Norman B. Rainer

(57) ABSTRACT

Gold and other metals in dissolved anionic form are removed from cyanide-derived aqueous mining effluent by passage of the effluent through an array of conduits in series connectivity, each conduit containing a stationary permeable bed of a particulate absorbent having selective affinity for dissolved anionic metal species, the flow of said effluent through said array being adjusted to produce sharply defined absorption zones.

12 Claims, 1 Drawing Sheet

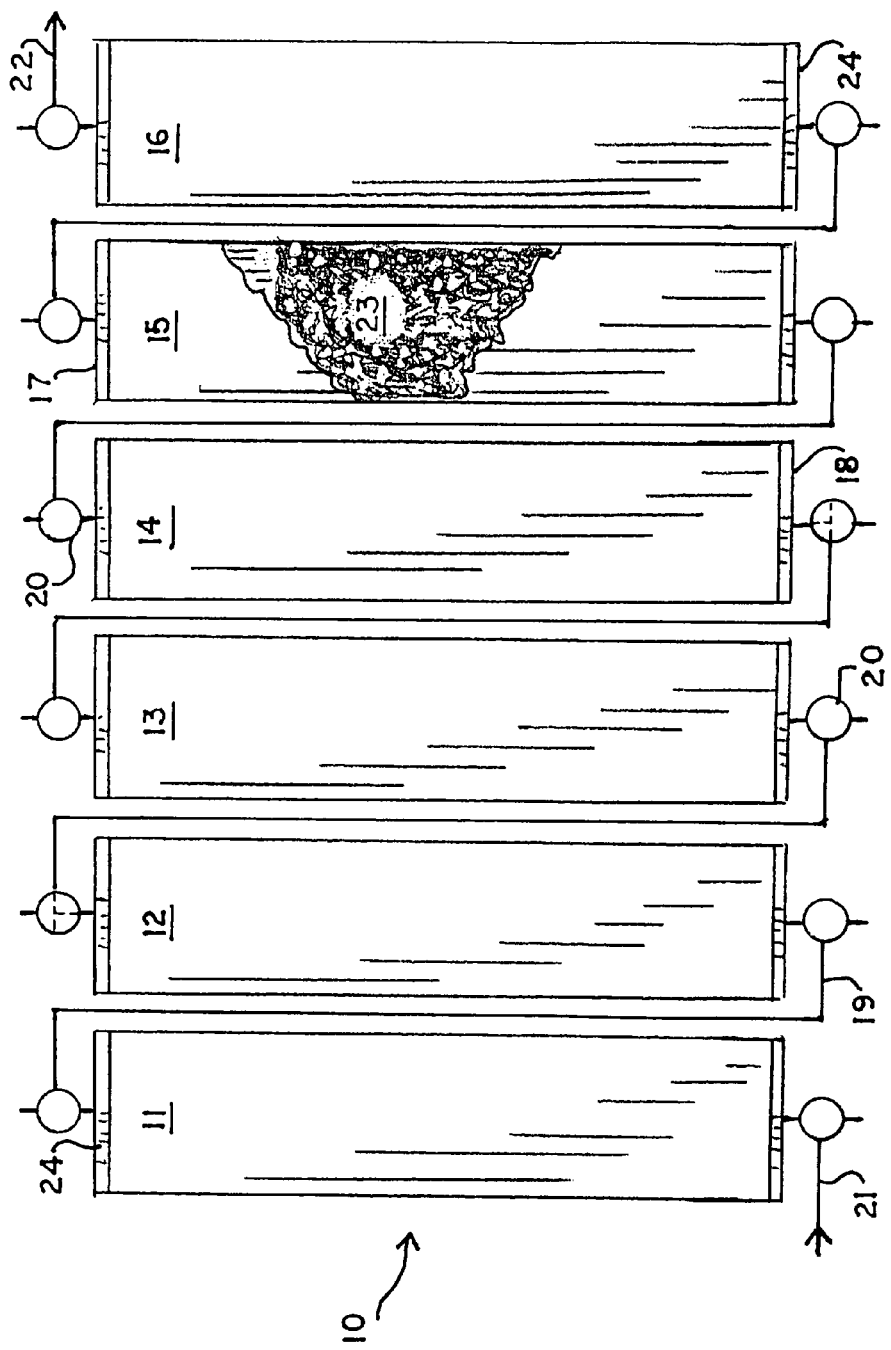

PROCESS FOR RECOVERING METALS FROM CYANIDE TAILINGS

RELATED APPLICATIONS

This application is based upon Provisional Application 61/461,734 filed Jan. 24, 2011, and which is incorporated herein by reference for its pertinent and supportive teachings.

BACKGROUND OF THE INVENTION

1. Field of the Invention

This invention concerns the treatment of cyanide-containing mining effluents, and more particularly relates to the recovery of gold from such effluents for economic value and removal of other metals for reasons of environmental protection.

2. Description of the Prior Art

The predominant method for mining gold involves the treatment of powdered gold-containing ore with an alkaline cyanide solution which dissolves finely divided gold particles dispersed within the ore. The resultant gold-containing aqueous cyanide solution is subsequently treated by way of electrolysis or precipitation techniques to recover the gold in metallic form.

In the course of such operations, a residual cyanide solution is produced as a "tailings" stream which contains trace amounts of gold in the form of aurocyanide anion, and other metals such as copper, silver, cadmium and nickel in the form of anionic cyanide complexes. The tailings are usually routed to an above-ground pond which functions as a long-term depository. Such tailings ponds are extremely toxic because of their high content of toxic heavy metal compounds and free cyanide.

Although the free cyanide can be destroyed by oxidizing agents such as chlorine and peroxide and long term exposure to air, the heavy metals remain as dissolved species in the pond. The ponds typically have a pH in the range of 8-10 and usually contain 2-10 parts per million (ppm) copper, 0.5 to 4 ppm gold, and other metals in concentration ranges of 2-10 ppm. Because of the high alkalinity of the water, and the complexity of its content, traditional metal removal technologies such as precipitation, electrolysis, and ion exchange have been technically unsuccessful or uneconomical. A primary challenge has been to selectively abstract the gold amidst the several other metal species present.

It is accordingly an object of the present invention to remove dissolved metals from cyanide-containing mine effluents.

It is a further object of this invention to provide a process whereby dissolved metals, particularly gold can be separately isolated from cyanide tailings ponds.

It is another object of the present invention to provide a process of the aforesaid nature which can economically reduce the toxicity hazard of a cyanide tailings pond.

These objects and other objects and advantages of the invention will be apparent from the following description.

SUMMARY OF THE INVENTION

The above and other beneficial objects and advantages are accomplished in accordance with the present invention by a process for treating an aqueous cyanide-containing mining effluent to selectively remove dissolved metal species therefrom, comprising:

a) passing said effluent sequentially through an array of 2 or more vertically elongated conduits having inlet and outlet extremities and arranged in series flow connectivity between upstream and downstream regions of said array and terminating in an exit passage, each conduit containing a stationary permeable bed of a particulate absorbent having selective affinity for dissolved anionic metal species, b) adjusting the rate of flow so as to produce a residence time of said effluent within said array adequate to enable one or more metal species to form a sharply defined absorption zone that travels toward said exit passage while defining an upstream region wherein the absorbent is saturated with said metal species, c) halting the flow through said upstream region, d) disconnecting from said connectivity those conduits within said upstream region containing metal-saturated absorbent, e) eluting the absorbed metal species from said disconnected conduits with a cyanide solution, f) re-connecting said eluted conduits with the remaining conduits, and g) resuming flow of said effluent through said array of conduits.

BRIEF DESCRIPTION OF THE DRAWING

For a fuller understanding of the nature and objects of the invention, reference should be had to the following detailed description taken in connection with the accompanying drawing forming a part of this specification.

FIG. 1 is a schematic side view of an embodiment of apparatus useful in the practice of the present invention, with portions broken away.

DESCRIPTION OF THE PREFERRED EMBODIMENTS

The present invention is based in part upon the discovery that absorption beds comprised of certain polymers having selective affinity for dissolved anionic metal species can, under specialized conditions, fractionate a mixture of said species into separate absorption zones which permit desorption with cyanide elutriating solutions.

Polymers which are useful for the selective absorption of dissolved metal species are disclosed in U.S. Pat. Nos. 3,715,339; 5,002,984; 5,096,946 and 5,187,200, which are incorporated herein by reference. For the purposes of the present invention, a preferred polymer is the polyamine/polyamide produced by the thermally induced condensation of polyethyleneimine (PEI) with nitrilotriacetic acid (NTA). The resultant polymer is comprised of a branched chain of ethyl amine groups of primary, secondary and tertiary configuration, and said chain is cross-linked by way of amide bonds produced by the interaction of carboxyl groups of the NTA with secondary amine groups on the branched chains. Because of its specialized functionality, the polymer can absorb ionized metal species by way of complexation with ethyl amine groups provided by the PEI, and chelation with carboxyl groups provided by the NTA. It has been found that, for optimal efficiency of absorption of anionic metal species from alkaline solutions, preferred polyamine/polyamide polymers should have a NTA/PEI ratio between 0.8 and 1.3. Such polymers can be produced in granular form and also as a deposit within a large sized porous substrate such as cellulosic sponge, as disclosed in U.S. Pat. No. 5,096,946. Beds of the polymer confined within a conduit should have a height (H) to diameter (D) ratio of (H/D) preferably between 2 and 10. The polymer can absorb 4%-12% gold (dry weight basis).

The conduits employed for treating cyanide-containing effluents by the process of this invention are preferably pipes or columns of circular cylindrical configuration fabricated of plastic, glass, corrosion-resistant metal or coated metal and having an inside diameter of 8-24 inches. Conduits which are transparent or equipped with sight glasses or sight ports are preferable because they permit visual inspection of the bed of polymer, whose color may change with the absorption of various metal species. The conduits are interconnected by conventional valving and plumbing components capable of routing water between conduits or stopping flow, or diverting flow away from the array of conduits.

Referring to FIG. 1, an array 10 is shown comprised of six identical individual conduit columns, 11, 12, 13, 14, 15 and 16 having upper and lower extremities 17 and 18, respectively, which serve as either inlet or outlet extremities. The conduits have end caps 24 at each extremity and are interconnected by piping 19 and three-way valves 20 to provide series flow connectivity or diverted flow. Entrance and exit passages 21 and 22, respectively, are associated with the first and last conduits 11 and 16, respectively. In the particular embodiment shown in FIG. 1, the water flow is shown to pass upwardly through the conduits. Each conduit is filled to about 75% height with particulate polyamine/polyamide polymer 23, as shown in the cut-away view of conduit 15. Conduits 11-13 may generally be considered to be the upstream region of the system, and conduits 14-16 may be considered the downstream region.

The anionic metal species of the input cyanide tailings water are removed in absorption zones having sharply defined leading interfaces. In order to achieve such interfaces, adequate duration of time of contact of the polymer with the throughgoing liquid is needed. A preferred residence time is at least 30 seconds duration of the liquid within each bed of polymer, or a flow not greater than 2 bed volumes per minute based upon the empty bed geometric volume of the bed. As the interface of an absorption zone advances toward said exit passage, the bed or beds upstream therefrom are saturated with a particular metal or group of metals. The detection of the location of an interface may be achieved by visual observation or by the use of monitoring electrodes incorporated into the interior walls of the conduits or positioned at the outlet extremities. Samples for analysis can also be periodically removed from each column.

In order to achieve separation and isolation of at least one metal species, flow through the array is halted when an interface is detected adjacent the outlet extremity of a conduit. The one or more conduits located upstream from the interface are then isolated from the array, preferably by way of valve manipulation. A flow of an elutriating solution is then run through the one or more isolated conduits and routed to a separate facility where the metal may be recovered from solution, usually by way of electrolysis or precipitation. The beds in the thusly eluted conduits are then washed by a flow of water and reconnected to the remaining, downstream conduits for continued processing of the mining tailings water.

The elutriating solution is preferably an aqueous solution containing 0.1 to 1.0% of an alkali metal cyanide plus about 1% of sodium hydroxide. Such solutions have a pH of about 10 and efficiently desorb absorbed species without adversely affecting the polyamine/polyamide polymer. In fact, the eluted and washed beds of polymer are immediately ready for their next absorption cycle without the need for any intervening activation step. In gold cyanide tailings ponds, the most commonly occurring metal beside gold is copper, and the concentration of copper is usually 5 to 10 times the concentration of gold. Accordingly, the separation of gold from copper in cyanide tailings has been a classic challenge.

The following example is presented for illustrative purposes without intending to be limitative of the scope of the invention.

EXAMPLE 1

A polyamine/polyamide polymer useful in the process of the present invention was produced by initially preparing a homogeneous aqueous prepolymer solution consisting of 10 parts by weight NTA, 10 parts by weight PEI (having a molecular weight of 1800), and 24.4 parts by weight water. The solution was impregnated into a flat sheet of regenerated white cellulose sponge, and the sheet was cut to produce half inch cubes. The impregnated cubes were heated at 330° F. in an air-circulating oven until a brown color develops, a characteristic of the polyamine/polyamide polymer. The resultant cubes, containing 68% by weight of polymer, were entered into six vertically oriented transparent acrylic plastic conduit columns of 8" inside diameter and 6' height, forming a bed of 4.5' height in each column. The columns were arranged in an array providing series flow connectivity by virtue of 3-way valves and appropriate piping.

A cyanide-containing gold mining effluent solution was selected for testing, said solution containing 4.5 ppm copper, 0.9 ppm gold, and lesser amounts of cadmium, nickel and mercury. The solution, having a pH of 10.2 and being substantially colorless, was pumped into the entrance passage of the first column and caused to flow through the successive columns at a flow rate of 17.5 gallons per minute, emerging from an exit passage. The calculated residence time of the solution in each bed is 45 seconds. After about 100 gallons of flow, a bright blue absorption band develops having a sharply defined leading interface which progresses in the downstream direction.

When said interface was about to emerge from the third column, flow was discontinued. An elutriating solution comprised of 1% NaOH and 0.3% NaCN, and having a temperature of 85° F., was then run through the first three columns, the ingress and egress of said solution being directed by appropriate adjustment of said associated 3-way valves. After passage of one bed volume of elutriating solution per bed, a comparable volume of plain water was passed through the same beds for washing purposes, and combined with the preceding emergent elutriating solution to produce an output concentrate solution. Said concentrate solution, containing substantially only copper, was subjected to a conventional electroplating recovery operation, yielding metallic copper of 99+% purity. The resultant barren solution from the electroplating operation was recovered for subsequent elutriating use.

Beds 4-6, downstream from the third bed have no definitive color or interfaces. However, samples taken from each column for analysis indicate that the fourth column is saturated with substantially only gold. Accordingly, beds 4-6 are isolated from beds 1-3 and subjected to desorption with elutriating solution in the same manner that beds 1-3 were treated. The resultant concentrate solution was subjected to an electroplating treatment, and produced metallic gold of 90+% purity. Flow of the mining effluent solution was then resumed through the six beds of the array.

This Example demonstrates the unique functionality of the polymer of the present invention wherein anionic copper complex is absorbed preferentially to aurocyanide anion and said absorption is exclusive of other metal species, thereby permitting efficient separation of copper from subsequently absorbed aurocyanide. In essence, the absorbed copper "pushes" all other anionic species downstream within the array of columns. Said concentrate solutions will typically contain 0.5% to 4% by weight of the specifically isolated metals, representing a 5,000 to 40,000 fold concentration with respect to the metal concentrations in the initial mining effluent solution.

In further optional treatments, the metal-depleted mining effluent solution emergent from the last column of an array can be recycled through those columns devoid of copper, but still containing absorbed gold. Such action will achieve further fractionation whereby the absorbed gold will be better separated from trace levels of other metal species.

The expression "cyanide-containing mining effluent" as employed herein is intended to embrace effluents derived from a cyanide treatment of an ore and having dissolved cyanide-containing anionic species, whether or not free cyanide still exists.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for treating an aqueous cyanide-produced mining effluent containing anionic copper and gold to selectively remove dissolved species therefrom, comprising:
   a) passing said effluent sequentially through an array of 2 or more vertically elongated conduits having inlet and outlet extremities and arranged in series flow connectivity between upstream and downstream regions of said array and terminating in an exit passage, each conduit containing a stationary permeable bed of an absorbent polymer having selective affinity for dissolved anionic metal species,
   b) adjusting the rate of flow so as to produce a residence time of said effluent within said array adequate to enable one or more metal species to form a sharply defined absorption zone that travels toward said exit passage while defining an upstream region wherein the absorbent is saturated with said metal species,
   c) halting the flow through said upstream region,
   d) disconnecting from said connectivity those conduits within said upstream region containing metal-saturated absorbent,
   e) eluting the absorbed metal species from said disconnected conduits with a solution to produce an emergent elutriating solution,
   f) re-connecting said eluted conduits with the remaining conduits, and
   g) resuming flow of said effluent through said array of conduits.

2. The process of claim 1 wherein said absorbent polymer is a polyamine/polyamide.

3. The process of claim 2 wherein said polyamine/polyamide polymer is a product of the thermally induced condensation of polyethyleneimine (PEI) with nitrilotriacetic acid (NTA).

4. The process of claim 3 wherein the ratio of NTA/PEI is between 0.8 and 1.3.

5. The process of claim 1 wherein said polymer is impregnated into cubes of cellulose sponge.

6. The process of claim 5 wherein said cubes contain 50%-70% by weight of said polymer.

7. The process of claim 1 wherein copper is selectively removed from said effluent prior to subsequent removal of gold.

8. The process of claim 1 wherein said rate of flow is such as to cause said mining effluent to be in contact with the bed of absorbent polymer in each conduit for at least 30 seconds.

9. The process of claim 1 wherein the concentration of metals in said elutriating solution is 5,000 to 40,000 times greater than their concentration in the initial mining effluent.

10. The process of claim 1 wherein at least one of said conduits permits visual observation of the contained absorbent polymer.

11. The process of claim 10 wherein gold is eluted from conduits downstream from conduits showing the contained absorbent polymer to have a blue color.

12. The process of claim 1 wherein said elutriating solution contains NaCN.

* * * * *